US012657371B2

(12) United States Patent
Rucker et al.

(10) Patent No.: US 12,657,371 B2
(45) Date of Patent: Jun. 16, 2026

(54) DOCUMENT SCANNER

(71) Applicant: Capital One Services, LLC, McLean, VA (US)

(72) Inventors: Glen Rucker, Richmond, VA (US); David Campbell, Richmond, VA (US); Sriharini Gutta, McLean, VA (US); Mihir Shah, Richmond, VA (US); Shailendra Jain, Richmond, VA (US); Juan Carlos Posada, Richmond, VA (US); Richard Goldman, McLean, VA (US); Emily Beaugrand Rouse, McLean, VA (US); Manish Gulati, Plano, TX (US); Uday Jain, Glen Allen, VA (US); Bal Reddy Cherlapally, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 259 days.

(21) Appl. No.: 18/613,819

(22) Filed: Mar. 22, 2024

(65) Prior Publication Data

US 2025/0298961 A1 Sep. 25, 2025

(51) Int. Cl.
*G06F 40/134* (2020.01)
*G06F 40/14* (2020.01)

(52) U.S. Cl.
CPC ............ *G06F 40/134* (2020.01); *G06F 40/14* (2020.01)

(58) Field of Classification Search
CPC .................................................. G06F 40/134

USPC ......................................................... 715/205
See application file for complete search history.

(56) References Cited

U.S. PATENT DOCUMENTS

| | | | | | |
|---|---|---|---|---|---|
| 6,253,204 | B1 * | 6/2001 | Glass | .................. | G06F 16/9566 707/E17.115 |
| 7,231,606 | B2 * | 6/2007 | Miller | .................... | H04L 67/02 702/186 |
| 10,762,224 | B2 * | 9/2020 | Chao | .................. | G06F 16/9566 |
| 2004/0034635 | A1 * | 2/2004 | Czarnecki | ............. | G06F 16/951 |
| 2005/0289446 | A1 * | 12/2005 | Moncsko | ............ | G06F 16/9558 715/208 |

(Continued)

OTHER PUBLICATIONS

"10 BEST Broken Link Checker Tools to Check Your Entire Website [2024]," Sruthy, updated Mar. 7, 2024; Software Testing Help; retrieved from: https://www.softwaretestinghelp.com/broken-link-checker/, on Apr. 17, 2024, pp. 1-35.

(Continued)

*Primary Examiner* — Reza Nabi
(74) *Attorney, Agent, or Firm* — Banner & Witcoff, Ltd.

(57) ABSTRACT

Systems as described herein may include document scanning to identify problems with the documents. A document scanning system may determine a scope of a document scan. The system may initiate a silent mode of a browser application and send a request to access an enterprise document repository. The system may be granted read-only access and determine page elements associated with a document within the scope. Based on the page elements, the system may use a machine learning model to determine an indication of one or more problems with a document. Accordingly, the system may generate a health report for each document within the scope of the document scan.

20 Claims, 6 Drawing Sheets

(56)     References Cited

U.S. PATENT DOCUMENTS

| | | | | |
|---|---|---|---|---|
| 2014/0001255 | A1* | 1/2014 | Gazel Anthoine | ........................... H04M 1/72412 235/375 |
| 2015/0137972 | A1* | 5/2015 | Nepo | ..................... G08B 25/10 340/539.13 |
| 2016/0360033 | A1* | 12/2016 | Kocan | ................. H04M 7/0075 |
| 2021/0344693 | A1* | 11/2021 | Azad | ....................... G06F 21/53 |
| 2022/0329626 | A1* | 10/2022 | Sambamoorthy | ... H04L 63/1483 |
| 2022/0391465 | A1* | 12/2022 | Roy | .................... G06F 16/9577 |
| 2023/0072238 | A1* | 3/2023 | Jakupi | ................ G01R 31/3274 |
| 2023/0095215 | A1* | 3/2023 | Cheaz | .................. G06F 16/958 707/728 |
| 2025/0298961 | A1* | 9/2025 | Rucker | .................. G06F 40/14 |

OTHER PUBLICATIONS

"GitHub—tcort/markdown-link-check: checks all of the hyperlink in a markdown text to determine if they are alive or dead," Thomas Cort, Mar. 11, 2024. GitHub; retrieved from: https://github.com/ tcort/markdown-link-check, on Apr. 17, 2024, pp. 1-5.

* cited by examiner

300

340

350

Key Vault

Document Scanning
Server

360

Network

310

User Device

320

Document Repository System

330

Training
Database

600

DOCUMENT SCANNER

FIELD OF USE

Aspects of the disclosure relate generally to big data and more specifically to the processing and management of data in an enterprise document repository.

BACKGROUND

Enterprise users may frequently create and store documents in an enterprise document repository. The content of the documents may include links to websites that facilitate data collection and exchange between enterprise users, or between businesses and consumers. Typically, the websites may consist of a large amount of static and dynamic content such as Hypertext Markup Language (HTML) files, images, logos, audio and video files and other applications. Because of the rapidly changing nature of this environment, website content may change location or become obsolete, which may negatively impact user experience and business reputation if the users are unable to access the content via the weblinks. As a result, a conventional system might lack a secure mechanism to proactively identify broken links or invalid links until the users have encountered the issue, which thereby limit the conventional system's ability to foresee and remediate the invalid weblinks.

Aspects described herein may address these and other problems, and generally improve the security, efficiency, and speed of processing web content to proactively scan documents and websites, and remediate invalid weblinks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for scanning documents in an enterprise document repository. A document scanning server may determine a plurality of data objects that fall within a scope of a document scan of an enterprise document repository. The data objects may include document identifiers associated with documents in the document scan, and the data objects may be stored in a JavaScript Object Notation (JSON) format. The server may initiate a silent mode of a browser application. The server may send, via the silent mode of the browser application, a request to access the enterprise document repository. The server may receive, from a cyber vault, an encryption key granting the server read-only access to the enterprise document repository. Based on scanning a Document Object Model (DOM) representing a document within the scope of the document scan, the server may determine a plurality of page elements associated with the document. The server may provide, as input to a machine learning model, the plurality of page elements associated with the document. For example, the plurality of page elements may include one or more Uniform Resource Locators (URLs), a section that contains the one or more URLs, a parent document, and/or a document scan status. The page elements may also include a rating and a page view associated with the document. The server may receive, as output from the machine learning model, an indication of whether the URLs in the document are likely to be broken. Accordingly, based on the indication, the server may generate a health report that includes each document that was within the scope of the document scan.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
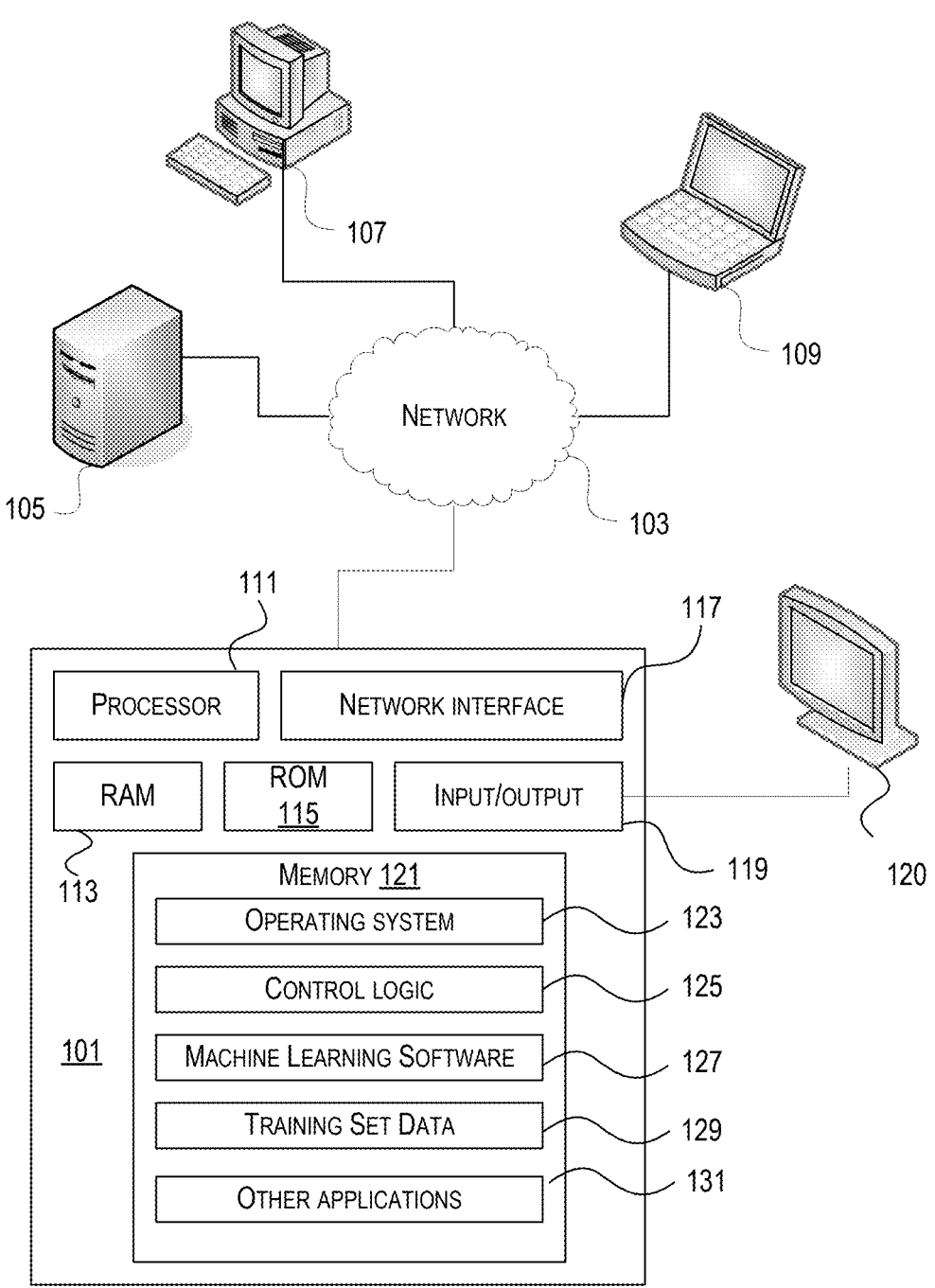
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects described herein may relate to document scanning to proactively identify with web-based documents, including invalid weblinks. A document scanning server may determine a plurality of data objects that fall within a scope of a document scan of an enterprise document repository. The data objects may include document identifiers associated with documents in the document scan. The data objects may also include a baseline URL to access the document within the scope of the document scan and a declaration whether the corresponding document is accessible. The server may initiate a silent mode of a browser application. The server may send, via the silent mode of the browser application, a request to access the enterprise document repository. The server may receive, from a cyber vault, an encryption key granting the server read-only access to the enterprise document repository. Based on scanning a DOM representing a document within the scope of the document scan, the server may determine a plurality of page elements associated with the document. The server may provide, as input to a machine learning model, the plurality of page elements. For example, the plurality of page elements may include one or more Uniform Resource Locators (URLs), a section that contains the one or more URLs, a parent document, a document scan status, and the like. The document scan status may include a date and/or time of a current document scan or a previous document scan, a status indicating whether the previous document scan has completed successfully, and/or an indication of whether the previous document scan identified any broken links in the document. The page elements may also include a rating and/or a page view associated with the document. The server may receive, as output from the machine learning model, an indication of whether the one or more URLs in the document are likely to be broken. Based on the indication, the server may generate a health report for each document that was within the scope of the document scan. After generating the health report, the server may terminate the silent mode of the browser application.

In many aspects, the machine learning model may generate an indication of at least one of a broken link, a dead link, a blank page, a stale page, or an anti-pattern. Prior to providing the plurality of page elements, the machine learning model may be trained based on historical scan data comprising at least one of: dates and time of historical document scans, pre-labeled historical documents comprising broken links, or pre-labeled historical documents comprising stale pages, blank pages and anti-patterns, etc.

In many aspects, prior to providing the plurality of page elements, the machine learning model may be trained based on real time data streamed by producers via a Session Description Protocol (SDP). The real time data may include at least one of: identified documents in the current document scan comprising broken links, identified documents in the current document scan comprising stale pages, blank pages and anti-patterns, and the like.

In many aspects, after receiving indications that the one or more URLs are likely to be broken, the server may determine, using a second machine learning model and based on historical scan data, a recommendation for alternative links to replace the URLs that are likely to be broken.

In many aspects, the server may determine a recommendation of a time to execute the document scan using a third machine learning model. For example, the server may provide, as input to the third machine learning model, the scope of the document scan. The third machine learning model may be trained based on historical loads on the enterprise document repository and historical schedules of document scans. The server may receive, from the third machine learning model and based on the input, the recommendation of the time to execute the document scan.

The document scanning system may differ from conventional data processing systems at least because it may implement an enhanced security and efficiency to access a document repository via a silent mode of a browser application without exposing underlying documents to an external network. The present system is significantly more than merely randomly scanning documents for broken links; rather, the present system may consider the status of previous and current document scans, analyze page elements contained in a document, and predict whether the document contains one or more problems, such as a broken link, a dead link, a blank page, a stale page, or an anti-pattern. The present system may also provide a recommendation for solutions, such as alternative links to replace one or more links that are likely to be broken. The present system may use one or more machine learning models to identify issues and recommend solutions.

Aspects described herein improve the functioning of computers by improving the accuracy, security and performance of computer-implemented data collection and storage processes. The steps described herein recite improvements to computer-implemented document scanning processes, and in particular improve the accuracy and utility of website page elements and weblinks. This is a problem specific to computer-implemented scanning processes, and the processes described herein could not be performed in the human mind (and/or, e.g., with pen and paper). For example, as will be described in further detail below, the processes described herein rely on the execution of a silent mode of a browser application and accessing the URLs of the websites, the collecting and processing of page elements, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

Figure 2:
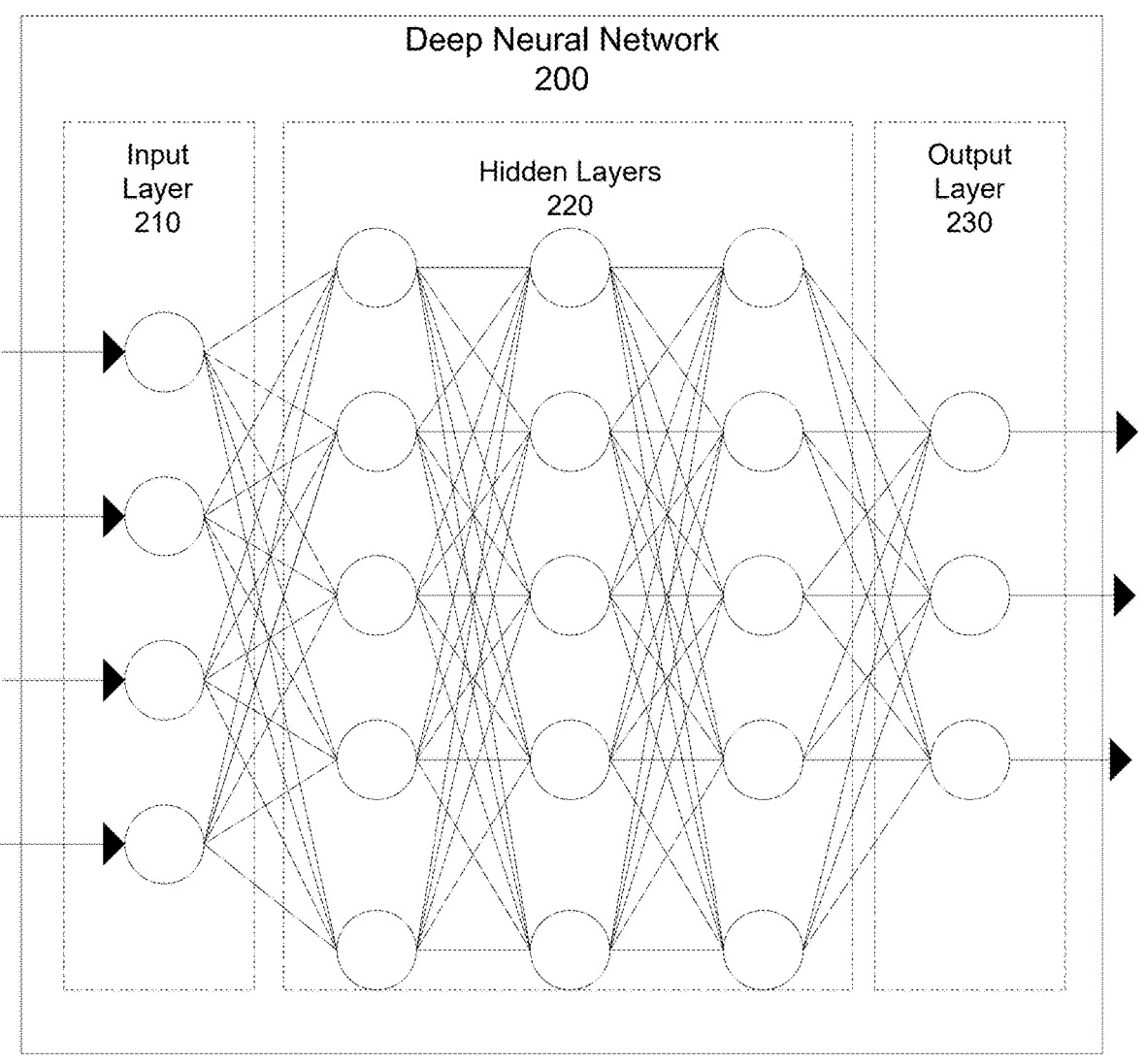
FIG. 2 depicts an example of deep neural network architecture for a model according to one or more aspects of the disclosure.

FIG. 2 illustrates an example of deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
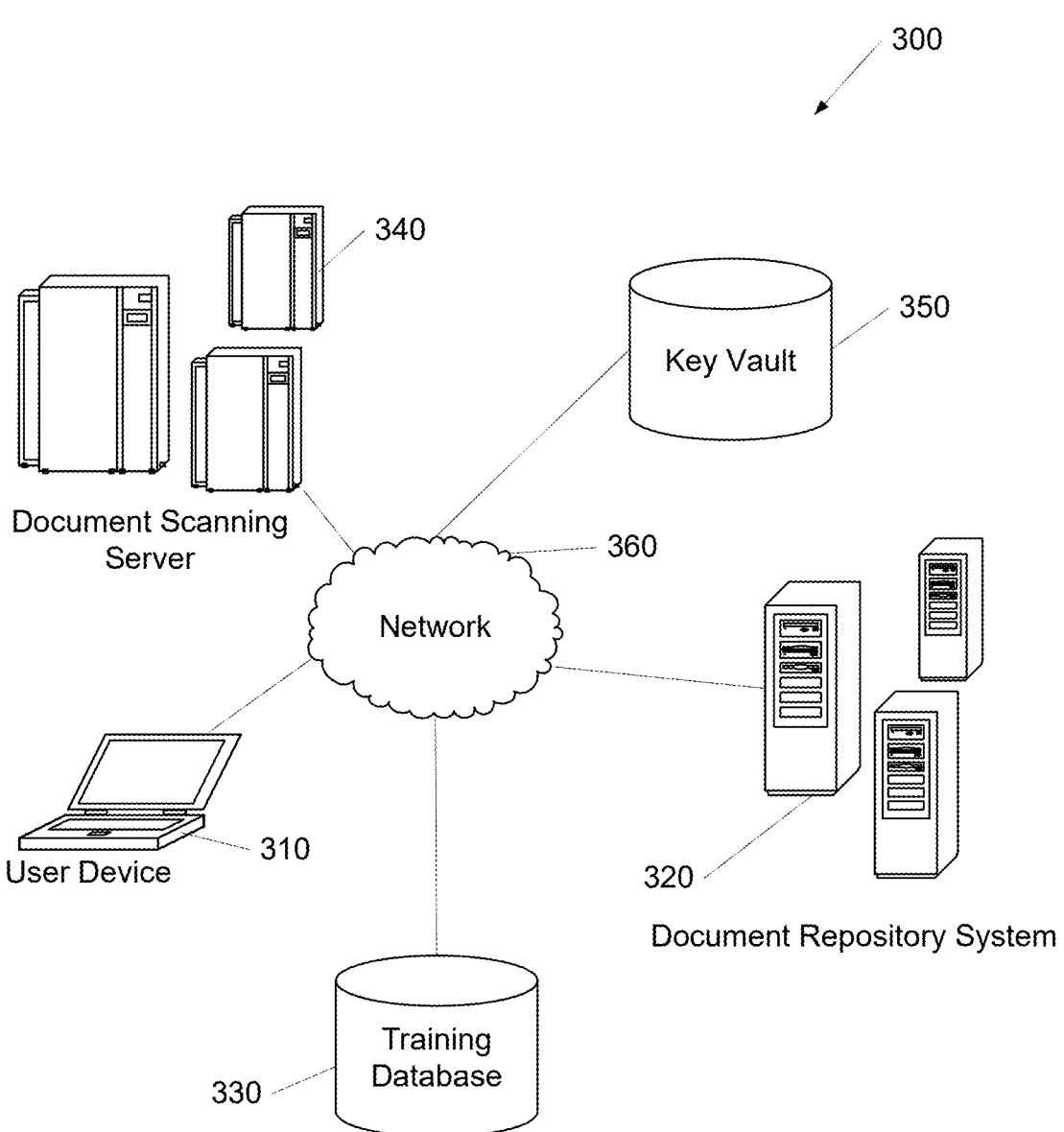
FIG. 3 shows an example of a system for document scanning in which one or more aspects described herein may be implemented.

FIG. 3 depicts a system 300 for document scanning. The document scanning system 300 may include at least one user device 310, at least one document repository system 320, at least one training database 330, at least one document scanning server 340, and/or at least one key vault 350 in communication via a network 360. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

User device 310 may execute a browser application in silent mode and use the browser application to access enterprise document repository 320. User device 310 may receive an encrypted key from key vault 350 which may grant user device 310 read-only access to document repository system 320. User device 310 may use a machine to machine interaction to receive the encrypted key and extract a password. Through an automated process and machine to machine interaction, user device 310 may mimic an enterprise user accessing the document repository system 320 using a machine role. For enhanced security, the password may be regenerated periodically (e.g., every two weeks) and may not be directly visible to any human user within the enterprise, including an enterprise administrator.

User device 310 may use the browser application to collect information, such as page elements from a document in document repository system 320. User device 310 may also use other mechanisms (e.g., Application Programming Interfaces (APIs), cookies, front end or server end code, integrations with Content Management System (CMS), applications on ecommerce platforms, etc.) to collect page element information. The page elements may include information, such as one or more URLs contained in a document, a section in the document that contains the one or more URLs, a parent document, a document scan status, a rating and a page view of the document, and the like. User device 310 may collect and send the page elements, and/or receive indication of whether the URLs in the document are likely to be broken, as described herein. User device 310 may receive a health report for each document within a scope of the document scan. The health report may include indications of problems with a document, such as broken links, dead links, blank pages, stale pages, or anti-patterns. User device 310 may terminate the silent mode of the browser application after generating the health report.

Document repository system 320 may collect, parse, and/or store documents created by enterprise users. The documents may include static and dynamic web content, such as, HTML content, pictures, graphics, audio and video files, web applications, etc. The web content may contain URLs referencing additional web content. As the enterprise users frequently update the documents, the references, such as the hyperlinks to the web content, may be changed or become obsolete. For example, a document may be located at a location identified by a first URL. The document may be subsequently moved to a new location corresponding to a second URL. An outdated URL in the document may result in a broken link, a dead link, a blank page, a stale page, or an anti-pattern.

Training database 330 may receive, store and provide training data to train different machine learning models. Training database 330 may store a set of training data to train a machine learning model to generate an indication of whether the one or more URLs in the document are likely to be broken. The training data may include historical information on past document scans. For example, the training data may include dates and time of historical document scans, and pre-labeled historical documents comprising broken links, stale pages, blank pages or anti-patterns. The training data may include information on a current document scan. For example, the training data may include real time data streamed by producers via a Session Description Protocol (SDP) that include identified documents in the current document scan comprising broken links, stale pages, blank pages or anti-patterns.

Training database 330 may store a set of training data to train a machine learning model to determine an alternative link to replace a URL that is likely to be broken. The training data may include structures or formats of training URLs, changes to the training URLs over time, and changes to the corresponding documents and sections in the documents.

Training database 330 may store training data to determine a recommended time to execute the document scan. The training data may include historical loads on document repository system 320 and schedules of historical document scans of the same documents in the current document scan. The training data may include pre-labeled URLs that are valid or not valid.

Document scanning server 340 may invoke silent mode of the browser application to be executed on user device 310. After the browser application has been initiated, document scanning server 340 may send, via the machine to machine interaction, a request to access an enterprise document repository to document repository system 320. Document scanning server 340 may determine a scope of a document scan, and the request to access the enterprise document repository may include information related to the scope of the document scan. For example, an administrator may define the scope of the document scan in a configuration step and the scope may correspond to document identifiers and/or baseline URLs to access these documents. The document identifiers and baselines URLs may be stored in a configuration database (not shown in FIG. 3), or document repository system 320 in the form of JSON data objects indicating the scope of the document scan. The scope corresponding to document identifiers and/or baseline URLs may be stored in an alternative format, such as a CSV format. Document scanning server 340 may receive an encryption key from cyber vault 350, granting document scanning server 340 read-only access to the enterprise document repository. Document scanning server 340 may have read-only access to a subset of the enterprise document repository consistent with the scope of the document scan. For example, document scanning server 340 may have read-only access to the documents with document identifiers defined in the scope of the document scan. Document scanning server 340 may store a declaration whether a specific document is accessible in the JSON data objects defining the scope of the document scan. Such declarations and data objects may be stored in the configuration database, document repository system 320 or a CSV file.

After a confirmation of read-only access and/or an entitlement check for a particular document, document scanning server 340 may receive page elements related to the documents. The page elements may be received from user device 310 that access the document using the browser application on behalf of document scanning server 340. The document may have a DOM representation and the page elements may be nodes and objects in the DOM representation. Document scanning server 340 may scan the DOM representation, and extract a plurality of page elements associated with the document. Document scanning server 340 may process the page elements to filter out irrelevant page elements and determine certain page elements that may be indicative of problems (e.g., invalid links) in the document. For example, document scanning server 340 may filter out page elements based on keywords in the DOM representation of the document. Document scanning server 340 may filter out page elements, for example, based on their locations or formats in the DOM representation of the document. Document scanning server 340 may filter out the page elements, for example, based on relationships of the page elements with other page elements in the DOM representation. After the filtering process, the page elements indicative of problems (e.g., invalid or broken links) may include a baseline URL to access the document, one or more URLs contained in the document, a section in the document that contains the URLs, a parent document related to the document, and the like. The page elements may include information indicating the status of a current or previous document scan, such as a date and time of the document scan, whether the document scan has completed successfully, indications of whether invalid links have been identified in the document, etc. The invalid links may include a dead link, a blank page, a stale page, or an anti-pattern, and so on. The page elements may also include a rating of the document, or a page view associated with the document.

Document scanning server 340 may provide the page elements indicative of invalid links as input to a machine learning model. Document scanning server 340 may receive an indication of whether the one or more URLs in the document are likely to be broken or otherwise invalid as output from the machine learning model.

After receiving indications that the one or more URLs are likely to be broken, document scanning server 340 may determine alternative URLs to replace the more or more URLs. For example, document scanning server 340 may use a second machine learning model to determine alternative URLs based on a structure or format of the URL that is likely to be broken, a change to the URL over time, a change to the document or a section of the document containing the URL over time, etc.

Document scanning server 340 may provide a scope of the document scan as input to a third machine learning model. Document scanning server 340 may receive, as output from the third machine learning model, a recommendation of a time to execute the document scan. The third machine learning model may be trained based on historical loads on the enterprise document repository and schedules of historical document scans of the same or similar documents in the current document scan.

Document scanning server 340 may generate a health report for each document within the scope of the document scan. The health report may include indications of whether the one or more URLs in the document are likely to be a broken link, a dead link, a blank link, a stale page, an anti-pattern, and so on. The health report may include a status of the current document scan and the date and time of the current document scan. The health report may be stored with the document in document repository system 320.

Key vault 350 may comprise one or more devices residing in an enterprise system that manages the generation, exchange, storage, use and update of cryptographic keys for the enterprise systems. Key vault 350 may be a cloud-based security service that provides a secure and centralized storage solution for cryptographic keys and secrets, such as passwords, certificates and keys used for encryption. Key vault 350 may implement enhanced security and reduce the risk of data breaches, given that no human user is allowed to have direct access to the encryption key. User device 310 may receive the encryption key from key vault 350, for example, via a machine to machine interaction on behalf of document scanning server 340. The encryption key may support single sign-on (SSO) access and grant read-only access to documents within the scope of a document scan during the course of the document scan.

User device 310, document repository system 320, training database 330, document scanning server 340, and/or key vault 350 may be associated with a particular authentication session. Document repository server 340 may receive page elements of the documents, process the page elements, and/or share document health reports with user device 310, document repository system 320, and/or training database 330, as described herein. However, it should be noted that any device in the document scanning system 300 may perform any of the processes and/or store any data as described herein. Some or all of the data described herein may be stored using one or more databases. Databases may include, but are not limited to, relational databases, hierarchical databases, distributed databases, in-memory databases, flat file databases, XML databases, NoSQL databases, graph databases, and/or a combination thereof. The network 360 may include a local area network (LAN), a wide area network (WAN), a wireless telecommunications network, and/or any other communication network or combination thereof.

The data transferred to and from various computing devices in document scanning system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the document scanning system 300. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the document scanning system 300 in front of one or more computing devices such that any external devices may communicate directly with the specialized hardware.

Figure 4:
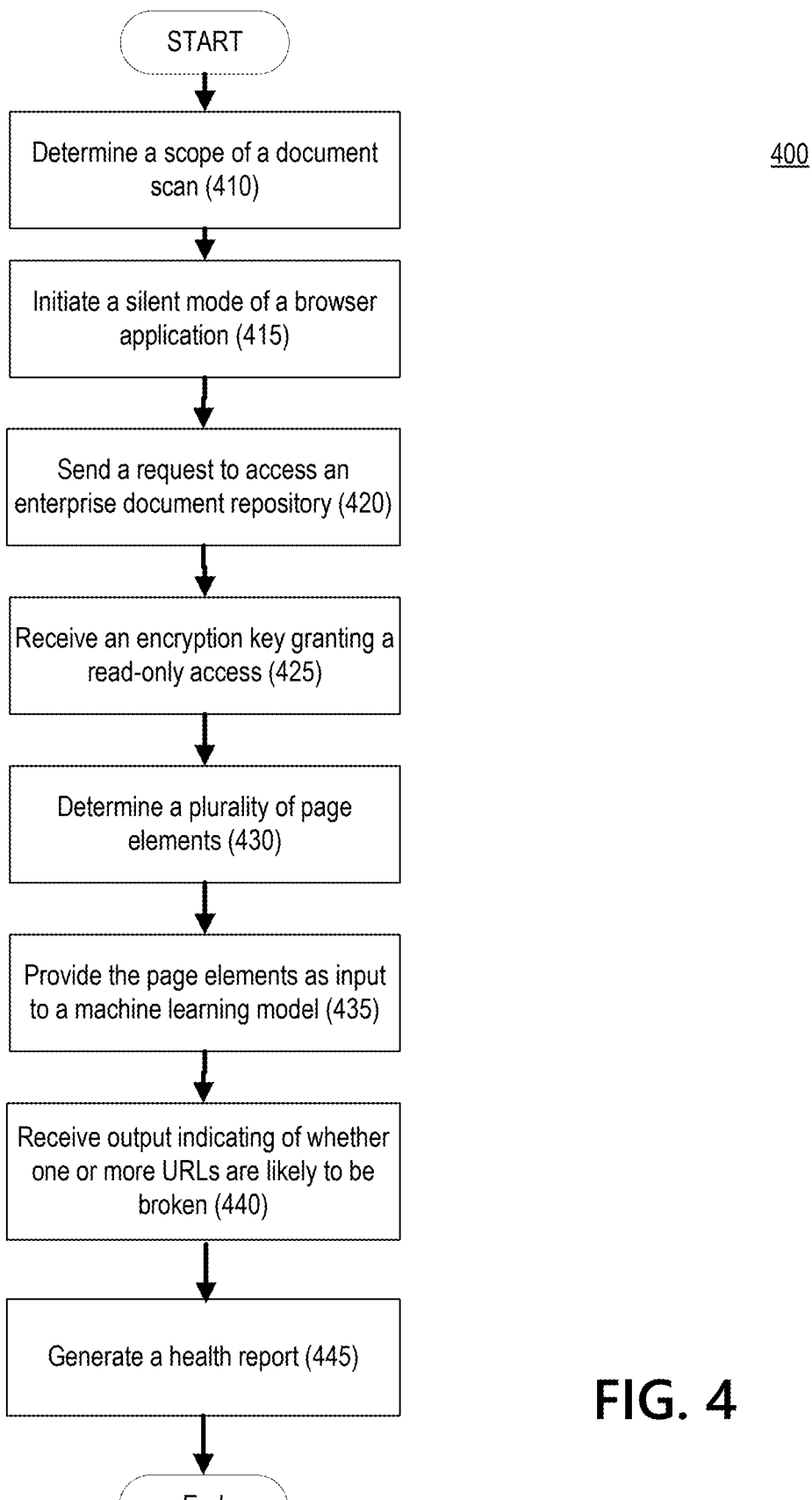
FIG. 4 shows a flow chart of a process for document scanning according to one or more aspects of the disclosure.

The document scanning system may collect and process page elements of documents retrieved from a browser application or other mechanisms during a document scan. The page elements may be indicative of whether one or more URLs are likely to be broken or otherwise invalid. As such, the page elements may be used to predict broken links before the actual occurrence of such events and enable the enterprise to act preemptively to implement remediation measures. FIG. 4 shows a flow chart of a process for document scanning according to one or more aspects of the disclosure. Some or all of the steps of process 400 may be performed using one or more computing devices as described herein.

At step 410, a document scanning server (e.g., document scanning server 340) may determine a plurality of data objects that fall within a scope of a document scan of an enterprise document repository (e.g., document repository system 320). An administrator may define the scope of the document scan in a configuration process. The data objects may include document identifiers associated with a plurality of documents in the document scan. The data objects may also include a baseline URL to access a document within the scope of the document scan. For example, a document may correspond to a website that has five different tabs, each tab may contain five pages. The administrator may define the scope of the document scan in a playbook to specify the website, the tabs and the pages that the document scanning server may access and scan. A playbook for a first document scan may stipulate to scan thirteen pages including five pages on a first tab, five pages on a second tab and first three pages on a third tab. A playbook for a second scan may stipulate to scan ten pages including the first three pages on a second tab, the five pages on the third tab and the first two pages on the fifth tab. The objects in the playbook representing the website, tab and page information may be stored in an unstructured data format, such as a string of characters in a .csv file. The objects in the playbook may be stored in a common data format, such as a JSON format.

At step 415, the document scanning server may initiate a silent mode of a browser application. In the silent mode, the document scanning server may invoke a feature of the browser application that allows for automated tasks, such as running a script for scanning documents without opening the browser. For example, the document scanning server may invoke a headless mode of a Chrome browser with a functionality that allows the execution of a full version of the Chrome browser while controlling it programmatically. The Chrome browser may be executed via a command-line interface or using network communication by the document scanning server without graphics or display. Executing the silent mode of the browser application may improve resource efficiency, given that a headless browser might not need the resources to render and display web content, particularly the graphical elements and animations. Executing the silent mode of the browser application may increase processing speed of the document scan, as without rendering and displaying the web content, the headless browser may load and interact with web pages more quickly than their GUI counterparts. Executing the silent mode of the browser application may increase scalability, as the headless browser may run in the background without consuming graphical resources which renders it easier to scale. Executing the silent mode of the browser application may facilitate automating interactions with web pages, such as clicking links and navigating through pages.

At step 420, the document scanning server may send, via the silent mode of the browser application, a request to access an enterprise document repository (e.g., document repository system 320). The document scanning server may send a command to the browser application to mimic the human user to enter a baseline URL or click on a link to request access to a document that is within the scope of the document scan. The document scanning server may send a command to the browser application and execute the command in a background process. The document scanning server may retrieve the scope of the document scan from the playbook and include the scope of the document scan in the request. For example, the document scanning server may retrieve the playbook for the first document scan and send a first request to access thirteen pages including five pages on a first tab, five pages on a second tab and first three pages on a third tab on the website. For a different document scan, the document scanning server may retrieve the playbook for the second document scan and send a request to access ten pages including the first three pages on a second tab, the five pages on the third tab and the first two pages on the fifth tab on the website.

At step 425, the document scanning server may receive an encryption key from a cyber vault granting the server read-only access to the enterprise document repository. Consistent with the scope of the document scan, the document scanning server may retrieve the encryption key granting the server access to the documents within the scope of the document scan.

At step 430, the document scanning server may determine a plurality of page elements associated with the document. The document scanning server may retrieve the scope of the document scan from the playbook, including the document identifiers, the tab and page information, and/or the declarations whether the server has access to the pages within the scope. After confirming (e.g., verifying) that the document scanning server is entitled to access a first page, the document scanning server may send a command to the browser application to scan the first page. The browser application may execute the command in silent mode and send the page elements from the first page to the document scanning server. The browser application or other mechanisms installed on the user device may mimic the human user navigates through various websites, tabs and pages. The other mechanisms installed on the user device may include APIs, cookies, front end or server end code, integrations with Content Management System (CMS), applications on e-commerce platforms, and the like. For example, the browser application or other mechanisms may monitor the scanning process of a first website as it opens the first website identified by a baseline URL during the document scan. The machine role may perform various operations on the first website to interact with the page elements of the first website. For example, the machine role may navigate through thirteen pages including five pages on a first tab, five pages on a second tab and first three pages on a third tab on the first website. The browser application or other mechanisms may collect and download page elements on these thirteen pages, and send the page elements to the document scanning server.

The document scanning server may receive the page elements in an unstructured data format, such as a string of characters in a text format. The string of characters may be converted into a common format, such as a JSON format or an XML format. The document scanning server may retrieve the page elements by scanning a DOM representation of the document. The DOM structure may be used as a cross-platform and language-independent interface that treats, for example, an HTML or XML representation of the document as a logical tree structure, where each node is an object representing a document element. The document scanning server may receive and process the page elements in a data stream. The document scanning server may receive and process the page elements in a batch manner. For example, the page elements may be received periodically, such as once per minute or once per 10 seconds. If the page elements contain keywords collected from the pages, the keywords in the text format may be pre-processed, for example, by performing a random sampling of chunks of text to look for similarities among different batches to eliminate duplicate data. The keywords may be generated after a verification of non-duplicated data to produce a lightweight data payload.

At step 435, the document scanning server may provide the page elements as input to a machine learning model. The document scanning server may select the page elements that might be indicative of broken links as input to the machine learning model. The page elements indicative of broken links may include the baseline URL of the website, the one or more URLs on the pages, a tab, a page or a section that contains the one or more URLs, a parent document or website that is linked with the current document being scanned, a document scan status-such as a date and time of the current document scan and dates and times of previous document scans on the document, a status indicating whether a previous document scan has completed successfully, an indication whether the previous document scans have identified any invalid links, etc. The page elements may include a rating or a page view associated with the website. The page elements may include a type of the current website or parent websites (e.g., a paid website, a social network website, a website for developers, a content website, etc.). The page elements may include keywords on the website indicating a product or a service provided by the website.

Given that the document scan is executed in silent mode of the browser application, the page elements related to style and display, such as background-color, font-size, margin, height, width, etc. may be ignored. The document scanning server may extract page elements from the DOM structure indicative of broken links. For example, if a page element "data-uri" appears in the header portion of a HTML page and several HTTPS links appear in the body of the HTML page, the page element "data-uri" may correspond to a baseline URL to access the website. The document scanning server may provide the page element "data-uri" and the HTTPS links as input to the machine learning model.

At step 440, the document scanning server may receive, as output from the machine learning model, an indication of whether the one or more URLs in the document are likely to be broken. The machine learning model may be trained based on historical scan data including dates and time of historical document scans, pre-labeled historical documents comprising broken links, and/or pre-labeled historical documents comprising stale pages, blank pages and anti-patterns. For example, the document scanning server may produce a large amount of historical scan data for each document scan executed on the document portal. The historical scan data may contain links, URLs, status, dates and times of previous document scans, parent documents, document portal names, edge case value indicating whether a document scan has completed successfully or failed. The historical scan data may be stored in the unstructured format such as in .csv files. The historical scan data may be stored in structured format or in databases such as training databases 330.

The machine learning model may be trained based on real time data streamed by data producers via a Session Description Protocol (SDP) or indirectly via APIs to data consumers, such as the document scanning server. The real time data may include identified documents in the current document scan comprising broken links, stale pages, blank pages, anti-patterns and the like. The real time data may be stored in a data lake in its natural or raw format. The real time data may also be stored as structured data in databases such as training databases 330.

The machine learning model may be a supervised machine learning model and may be trained based on user feedback. For example, the administrator may provide feedback to verify whether an identified broken link, a dead link, a blank page, a stale page, or an anti-pattern is indeed invalid. The machine learning model may be re-trained based on the feedback data. The trained leaning model may preemptively identify a pattern of page elements that may indicate an invalid link. The likelihood may reflect the possibility of the invalid link prior to its actual occurrence. The document scanning server may determine the likelihood of an invalid link in real time, for example, during a course of a document scan.

In addition to the deep neural network model of FIG. 2, the machine learning model may include a decision tree structure, which may use multiple variable analysis. The decision trees may be produced by algorithms identifying various ways of splitting data into branch-like segments. Decision trees may partition data into subsets based on categories of input variables to provide insight to one's path of decisions. Alternatively and/or additionally, the machine learning model may include a linear or logistic regression model, which estimates relationships among variables, finding key patterns in large and diverse data sets of the page elements and how the page elements might be related to each other. Alternatively and/or additionally, the machine learning model may include time series algorithms that sequentially plot data for forecasting continuous values over time. For example, the machine learning model may predict the trend in the page elements, including the status and changes, that might lead to invalid links over time.

During the model training process, the weights of each connection and/or node may be adjusted as the model adapts to generate more accurate predictions on a training set. The weights assigned to each connection and/or node may be referred to as the model parameters. For example, the document scanning server may use a deep learning model and the model may be initialized with a first set of model parameters. The machine learning model may use the training data as input based on the first set of model parameters and determine the invalid links with a first confidence level. The document scanning server may generate a second set of model parameters based on the adjustment on the first set of model parameters. The machine learning model may use the training data as input based on the second set of model parameters and determine the invalid links with a second confidence level. Based on a comparison between the first confidence level and the second confidence level, the document scanning server may determine a more optimal set of parameters between the first set of model parameters and the second set of model parameters. The document scanning server may go through several iterations, and the machine learning model may be tuned with a set of optimal model parameters when the confidence level reaches a predetermined threshold (e.g., 95%).

The document scanning server may use the tuned or trained machine learning model to determine broken or otherwise invalid links based on the page elements collected from the document or website that is within the scope of the scan. Based on the page elements, the document scanning server may receive, as output from the trained machine learning model, a likelihood that one or more URLs on the website might be invalid. For example, the machine learning model may output that there is a 70% possibility that the page contains invalid links. The document scanning server may determine whether the likelihood exceeds a threshold value. The document scanning server may compare the likelihood with a predetermined value (e.g., 85%). If the likelihood does not exceed the threshold value, the document scanning server may not report the link as invalid. The document scanning server may receive further page elements associated with a next page of the website within the scope of the document scan. Subsequently, further page elements may be provided as input to the trained machine learning model, and the likelihood may be determined for the next page. As such, the likelihood may be updated dynamically as the scanning process navigates through various pages of the website. The document scanning server may go through several iterations until it processes all the pages within the scope of the document scan.

At step 445, the document scanning server may generate a health report for each document that was within the scope of the document scan. The health report may identify the invalid URLs on each page of the document scan based on the indications of likelihood that they might be broken. Continuing the example discussed above where the document scan comprises thirteen pages of a website, the health report may indicate that a first page contains two links that might be invalid, the tenth page contains one link that might be invalid, and the remaining eleven pages might not contain any invalid links. After generating the health report, the document scanning server may terminate the silent mode of the browser application.

After determining that the one or more URLs are likely to be broken, the document scanning server may determine alternative links to replace the URLs that are likely to be broken, for example, based on historical scan data and/or using a second machine learning model. For example, if the document scanning server identifies, in a current document scan, that a URL is likely to be invalid, the historical scan data may track the changes to the URL overtime. The machine learning model may use the historical scan data to identify that the URL might be malformed and provide an alternative format of the URL. In another example, the resource corresponding to the URL may be changed to a new location resulting in a broken link. The historical scan data may identify that another page contains a valid URL that references a similar resource, but in a different location. The machine learning model may use the historical scan data to identify the possible new location of the resource and provide an alternative URL. Based on the similarities in the page elements, the machine learning model may suggest the alternative format or location, and recommend an alternative URL to replace the faulty one. By classifying the structure of the URL, the status and changes of the URL over time, and similar changes applied to documents, tabs, pages or sections that contain the URL, the document scanning server may predict the alternative URL for recommendation.

The execution of a document scan may be on demand or may be scheduled for a particular time. The document scanning server may use a third machine learning model to recommend a time to execute a document scan. The document scanning server may provide the scope of the document scan as input to the third machine learning model. The scope of the document scan may correspond to objects defined in the playbook for the document scan, which may include the document identifiers, the tab and page information, the baseline URL for accessing the document and/or declarations whether the corresponding document is accessible. The third machine learning model may be trained based on historical loads on the enterprise document repository. In the example of the document scan of thirteen pages on a website, the historical scan data may indicate that the website may have peak load between 12 PM to 3 PM. The machine learning model may recommend a schedule outside the timeframe of the peak load. The third machine learning model may be trained based on historical loads on the enterprise document repository. Likewise, the machine learning model may recommend a schedule outside the timeframe of the peak load. The third machine learning model may be trained based on scheduled historical document scans, the durations of the document scan and the status indicating whether such document scans were completed successfully. For example, the schedules may indicate that historical document scans on the thirteen pages occurred at various times in the past—scan 1 at 1 AM was completed successfully in 10 seconds; scan 2 at 11 AM was completed successfully in 20 seconds; scan 3 at 2 PM was aborted after 30 seconds. The third machine learning model may recommend executing the document scan of the thirteen documents at 1 AM. After the third machine learning model have been trained based on the historical scan data, the trained third machine learning model may recommend a schedule (e.g., 1 AM) to execute the document scan.

Figure 5:
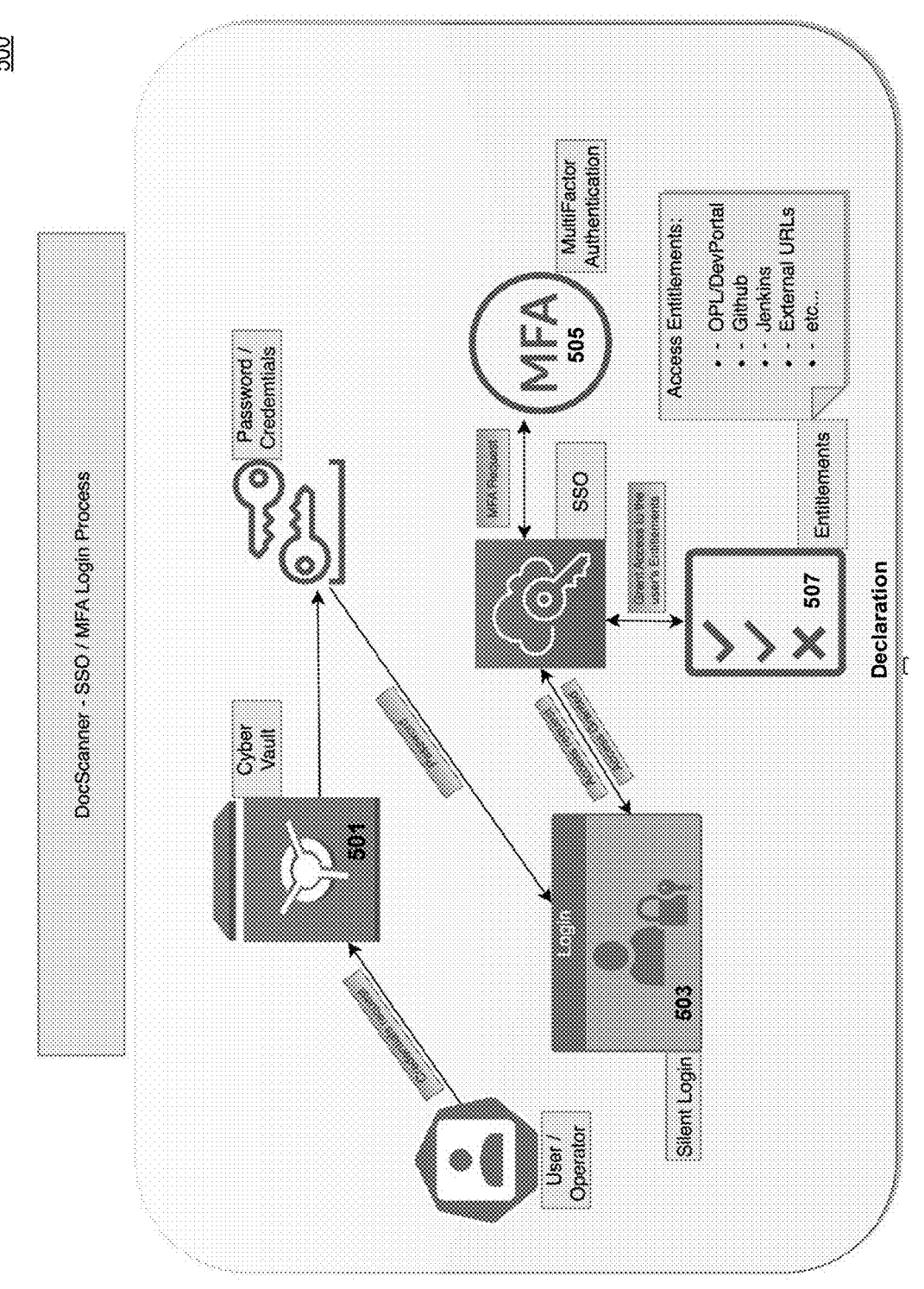
FIG. 5 shows an authentication process according to one or more aspects of the disclosure.

FIG. 5 shows authentication processes, including the SSO authentication and multi-factor authentication (MFA) processes, that may be performed in order for the document scanning server to receive the encryption key and appropriate entitlement. As illustrated in FIG. 5, a user or an operator (e.g., user device 310) may initiate a credential request to a cyber vault 501 (e.g., key vault 350) and retrieve a password via machine to machine interaction. Cyber vault 501 may be a device residing in an enterprise system that manages the generation, exchange, storage, use and update of password and credentials for the enterprise systems. Cyber vault 501 may also be a cloud-based security service that provides a secure and centralized storage solution for cryptographic keys and secrets, such as passwords, credentials, certificates and keys used for encryption. The operator from the user device may receive the password from cyber vault 501 via machine to machine interaction on behalf of the document scanning server. The operator might not have direct access to the password stored inside the cyber vault 501. The password may be a strong encryption key that is automatically rotated or re-generated periodically (e.g., every 14 days).

The user device may receive the password from cyber vault 501, and initiate silent mode of the browser application via its machine role 503. The user device may mimic a human user to input the password to a login page via the silent mode of the browser and start the login authentication process. Once the machine role hits the summit button, the SSO authentication process would be invoked. The SSO process may be an identification method that enables users to log in to multiple applications and websites with one set of credentials. SSO may streamline the authentication process for the users without the need to re-enter the credentials within a predetermined period of time. SSO may be provided as a third-party service behind the scenes to invoke relevant calls and provide the credentials to the applications and websites. The machine role may also register for MFA 505 that the machine role enters additional security information to provide an extra layer of security. After the machine role is successfully authenticated, read-only access may be granted. In the example above of executing a document scan for the document corresponding to the website, this means the machine role is granted read-only access to the website.

Once the machine role has access to the website, the machine role may mimic a human user and attempt to navigate through different tabs and pages as defined in the playbook. For example, the machine role may retrieve the scope of the document scan and attempt to scan thirteen pages on an external website that is maintained by a third-party, including five pages on a first tab, five pages on a second tab and first three pages on a third tab. A process may be invoked to check whether the machine role has the appropriate entitlement to access these pages. For example, it may be determined that the machine role has an entitlement to access all thirteen pages. Declaration 507 indicating that these thirteen pages are accessible may be recorded in the playbook or the JSON objects related to the external website. In another example, the machine role may attempt to scan ten pages on a different website, like code repository Github. It may be determined that the machine role has an entitlement to access to nine of the pages, and the access to the tenth page is denied. Likewise, the playbook or the JSON objects may be updated with a declaration indicating whether the pages are accessible for the document scan related to website Github.

Figure 6:
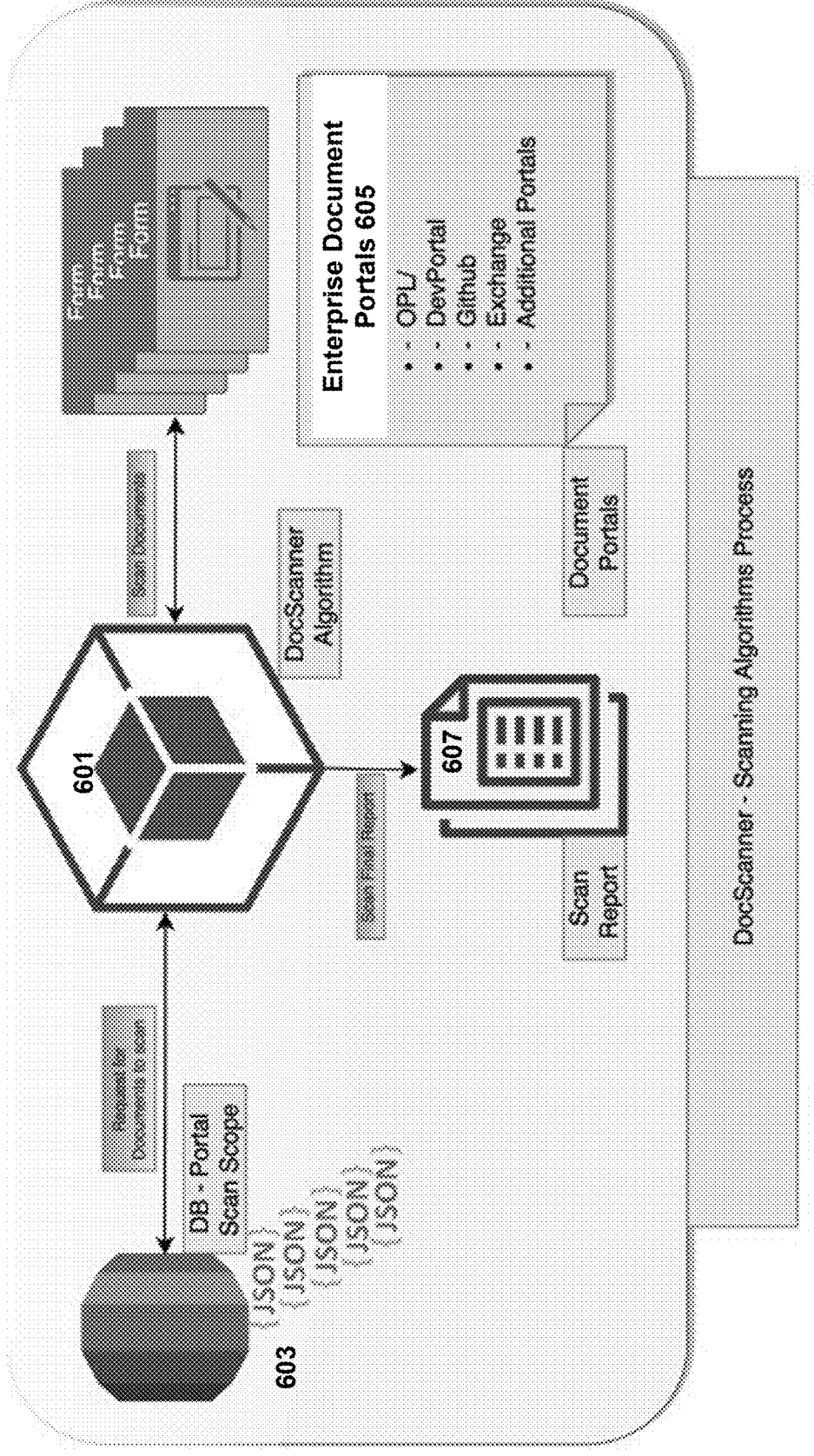
FIG. 6 shows a document scanning algorithm according to more aspects of the disclosure.

FIG. 6 shows a document scanning algorithm according to more aspects of the disclosure. A document scanning server 601 (e.g., similar to document scanning server 340) may request documents, for example, based on a scope of the document scan. The scope may be stored as JSON objects in database 603. Document scanning server 601 may retrieve the JSON objects from database 603 and the objects may include a document identifier, a baseline URL to access the document and a declaration whether the document scanning server has entitlement to access it. The document scanning server may start scanning each document individually as defined in the scope of the document scan. In the example of FIG. 6, the document repository is illustrated as enterprise document portals 605, which may include an OPL portal, a DevPortal, a Github portal, an exchange portal and additional portals. If the scope of the scan indicates 100 documents from DevPortal, document scanning server 601 may scan a first document from DevPortal. Document scanning server 601 may identify five URLs contained in the first page based on its page elements. Document scanning server 601 may check whether a request to a first URL of the first page returns a valid response (e.g., a HTTP response code 200), which means a document may be opened via the first URL, otherwise the URL is invalid. Once the document is opened properly, document scanning server 601 further checks for certain strings on the document. If the document contains, for example, an error or sorry message indicating that the document is not able to be located, the URL is marked as invalid given that the document contains no valid content. Document scanning server 601 may also check if the document is empty, and label the document as invalid if there is zero content in the document. The corresponding status of the URLs may be saved in health report or scan report 607. Scan report 607 may include broken links (e.g., returning a HTTP response code 400 or 500), a dead link (e.g., failing to direct to a location of another document), a blank page (e.g., containing no content), a stale page (containing content that has been removed or erased), or an anti-pattern (e.g., containing only sorry message). Additionally and/or alternatively, document scanning server 601 may use one or more machine learning models to predict invalid links and recommend alternative links to replace the invalid links.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
determining a plurality of data objects that fall within a scope of a document scan of an enterprise document repository, wherein the plurality of data objects comprise document identifiers associated with a plurality of documents in the document scan;
initiating, by a computing device, a silent mode of a browser application;
sending, by the computing device, via the silent mode of the browser application, a request to access the enterprise document repository;
receiving, by the computing device and from a cyber vault, an encryption key granting the computing device read-only access to the enterprise document repository;
determining, based on scanning a Document Object Model (DOM) representing a document within the scope of the document scan, a plurality of page elements associated with the document;
providing, as input to a machine learning model, the plurality of page elements associated with the document, wherein the plurality of page elements comprises one or more Uniform Resource Locators (URLs), a section that contains the one or more URLs, a parent document, and a document scan status;
receiving, as output from the machine learning model, an indication of whether the one or more URLs in the document are likely to be broken;
generating, based on the indication, a health report for each document of the plurality of documents that were within the scope of the document scan; and
after generating the health report, terminating, by the computing device, the silent mode of the browser application.

2. The computer-implemented method of claim 1, wherein the plurality of page elements further comprises a rating and a page view associated with the document.

3. The computer-implemented method of claim 1, wherein the document scan status comprises:
a date and time of a current document scan;
a date and time of a previous document scan;
a status indicating whether the previous document scan has completed successfully; and
an indication of whether the previous document scan has identified broken links in the document.

4. The computer-implemented method of claim 1, wherein the health report comprises an indication of at least one of: a broken link, a dead link, a blank page, a stale page, or an anti-pattern.

5. The computer-implemented method of claim 1, further comprising:
prior to the providing the plurality of page elements, training the machine learning model based on historical scan data comprising at least one of:
dates and time of historical document scans;
pre-labeled historical documents comprising broken links; or
pre-labeled historical documents comprising stale pages, blank pages and anti-patterns.

6. The computer-implemented method of claim 1, further comprising:
prior to the providing the plurality of page elements, training the machine learning model based on real time data streamed by producers via a Session Description Protocol (SDP), wherein the real time data comprises at least one of:
identified documents in the current document scan comprising broken links; or
identified documents in the current document scan comprising stale pages, blank pages and anti-patterns.

7. The computer-implemented method of claim 1, wherein the plurality of data objects comprises a URL to access a document within the scope of the document scan and a declaration whether the corresponding document is accessible.

8. The computer-implemented method of claim 1, further comprising:
after receiving indications that the one or more URLs are likely to be broken, determining, based on historical scan data and using a second machine learning model, a recommendation for alternative links to replace the one or more URLs that are likely to be broken.

9. The computer-implemented method of claim 1, further comprising:
providing, as input to a second machine learning model, the scope of the document scan, wherein the second machine learning model is trained based on historical loads on the enterprise document repository and schedules of historical document scans to the plurality of documents in the document scan; and receiving, from the second machine learning model and based on the input, a recommendation of a time to execute the document scan.

10. A system comprising:

one or more processors; and memory storing instructions that, when executed by the one or more processors, cause the system to:

determine a plurality of data objects that fall within a scope of a document scan of an enterprise document repository, wherein the plurality of data objects comprise document identifiers associated with a plurality of documents within the scope of the document scan;

initiate a silent mode of a browser application;

send, via the silent mode of the browser application, a request to access the enterprise document repository;

receive authorization to access the enterprise document repository;

determine, based on scanning a Document Object Model (DOM) representing a document within the scope of the document scan, a plurality of page elements associated with the document;

provide, as input to a machine learning model, the plurality of page elements associated with the document, wherein the plurality of page elements comprises one or more Uniform Resource Locators URLs, a section that contains the one or more URLs, a parent document, and a document scan status;

receive, as output from the machine learning model, an indication of whether the one or more URLs are likely to be broken;

generate, based on the indication, a health report for each document of the plurality of documents that were within the scope of the document scan; and after generating the health report, terminate the silent mode of the browser application.

11. The system of claim 10, wherein the instructions, when executed by the one or more processors, cause the system to:

after receiving indications that the one or more URLs are likely to be broken, determine, based on historical scan data and using a second machine learning model, a recommendation for alternative links to replace the one or more URLs that are likely to be broken.

12. The system of claim 10, wherein the plurality of page elements further comprises a rating and a page view associated with the document.

13. The system of claim 10, wherein the document scan status comprises:

a date and time of a current document scan;

a date and time of a previous document scan;

a status indicating whether the previous document scan has completed successfully; and an indication of whether the previous document scan identified broken links in the document.

14. The system of claim 10, wherein the health report comprises an indication of at least one of: a broken link, a dead link, a blank page, a stale page, or an anti-pattern.

15. The system of claim 10, wherein the instructions, when executed by the one or more processors, cause the system to:

prior to the providing the plurality of page elements, train the machine learning model based on historical scan data comprising at least one of:

dates and time of historical document scans;

pre-labeled historical documents comprising broken links; or pre-labeled historical documents comprising stale pages, blank pages and anti-patterns.

16. The system of claim 10, wherein the instructions, when executed by the one or more processors, cause the system to receive the authorization by:

receiving, from a cyber vault, an encryption key granting the system read-only access to the enterprise document repository.

17. The system of claim 10, wherein the instructions, when executed by the one or more processors, cause the system to:

prior to the providing the plurality of page elements, train the machine learning model based on real time data streamed by producers via a Session Description Protocol (SDP) comprising at least one of:

identified documents in the current document scan comprising broken links; or identified documents in the current document scan comprising stale pages, blank pages and anti-patterns.

18. The system of claim 10, wherein the instructions, when executed by the one or more processors, cause the system to:

provide, as input to a second machine learning model, the scope of the document scan, wherein the second machine learning model is trained based on historical loads on the enterprise document repository and schedules of historical document scans to the plurality of documents in the document scan; and receive, from the second machine learning model and based on the input, a recommendation of a time to execute the document scan.

19. One or more non-transitory media storing instructions that when executed by one or more processors, cause a computing device to:

determine a plurality of data objects that fall within a scope of a document scan of an enterprise document repository, wherein the plurality of data objects comprise document identifiers associated with a plurality of documents in the document scan;

initiate a silent mode of a browser application;

send, via the silent mode of the browser application, a request to access an enterprise document repository;

receive, from a cyber vault, an encryption key granting the computing device read-only access to the enterprise document repository;

determine, based on the scope of the document scan, a plurality of page elements associated with the document;

provide, as input to a machine learning model, the plurality of page elements associated with the document, wherein the plurality of page elements comprises one or more Uniform Resource Locators URLs, a section that contains the one or more URLs, a parent document, and a document scan status;

receive, as output from the machine learning model, an indication of whether the one or more URLs are likely to be broken;

generate, based on the indication, a health report for each document of the plurality of documents that were within the scope of the document scan; and after generating the health report, terminate the silent mode of the browser application.

20. The non-transitory media of claim 19, wherein the instructions, when executed by the one or more processors, cause the computing device to:

after the receiving indications that the one or more URLs are likely to be broken, determine, based on historical scan data and using a second machine learning model, a recommendation for correct links to replace the one or more URLs that are likely to be broken.

\* \* \* \* \*